March 31, 1942.　　A. STRAUSS ET AL　　2,278,187
FOOD PROCESSOR
Filed Jan. 8, 1940　　11 Sheets-Sheet 2
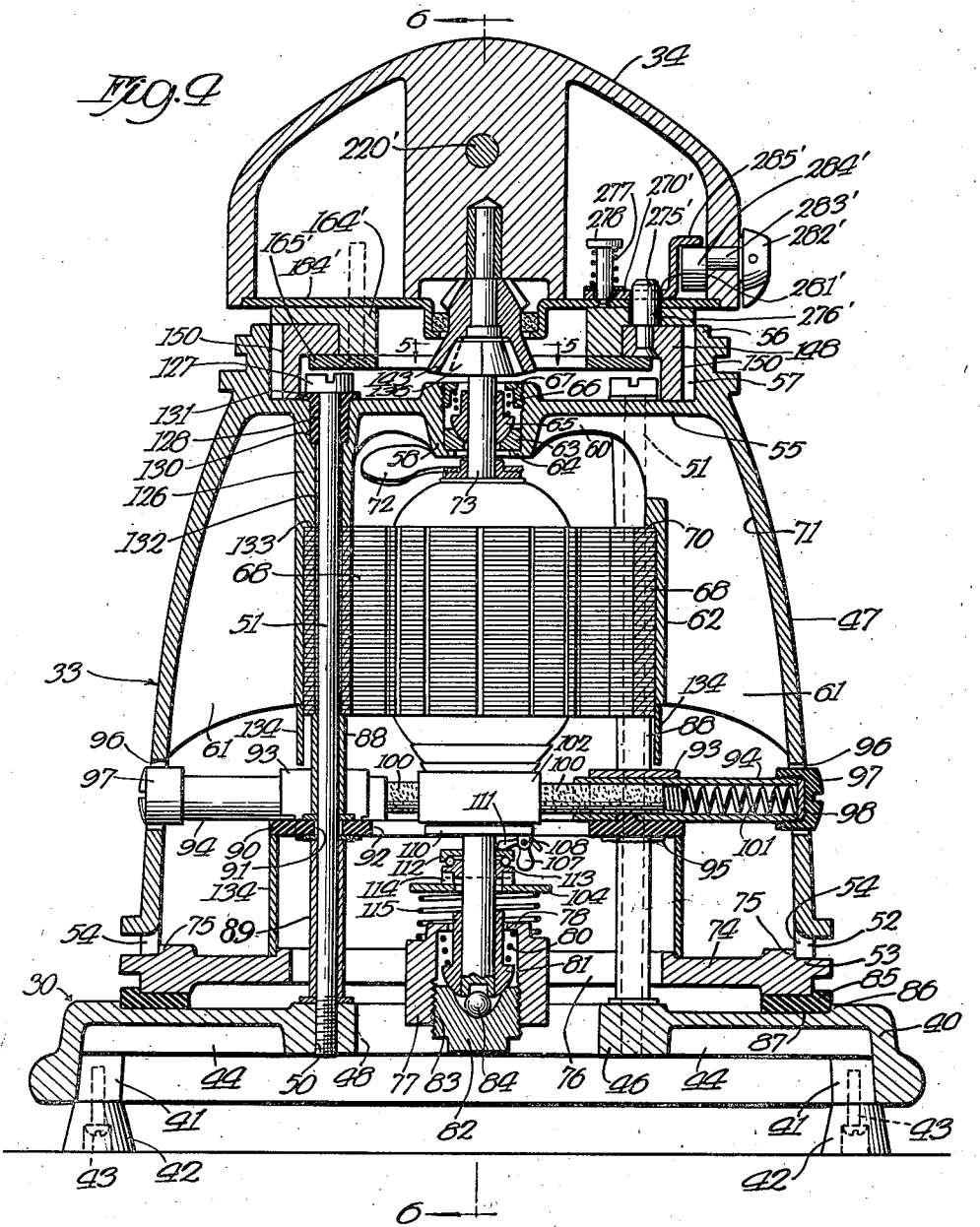
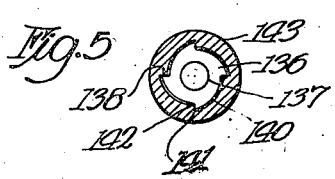
Inventors:
Alfred Strauss
Eric G. Feltman
Melville M. Hunt
Watson D. Harbaugh

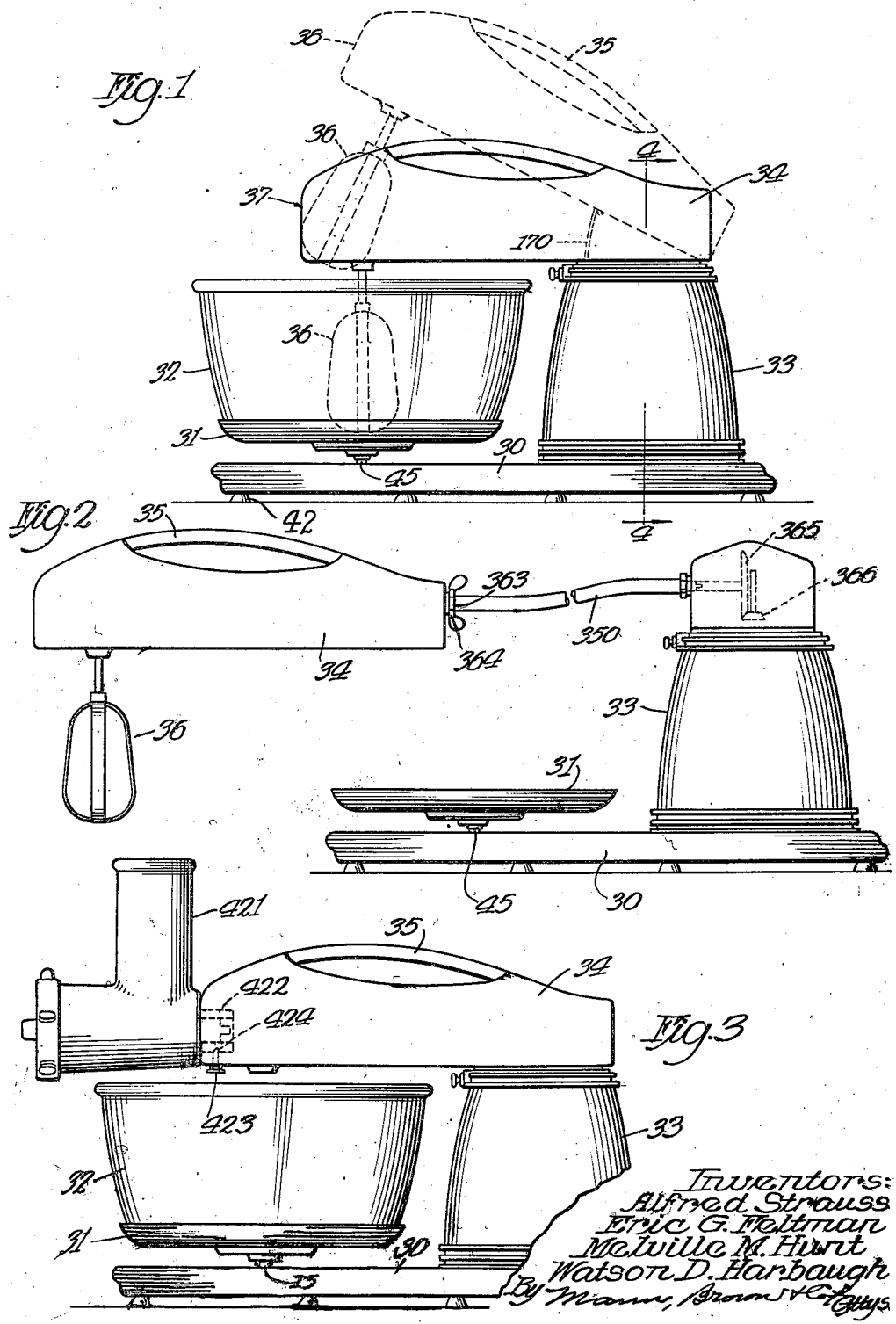

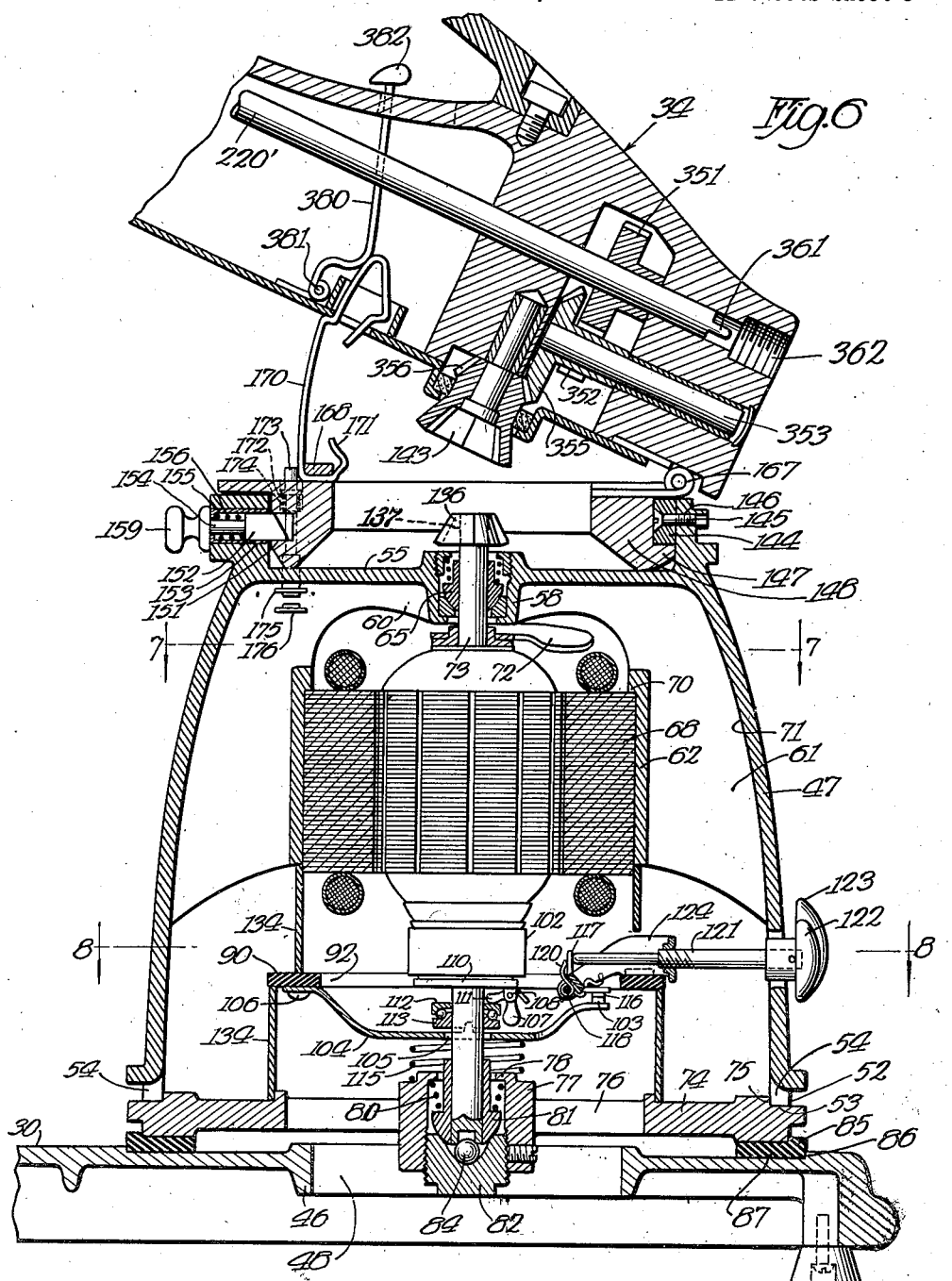

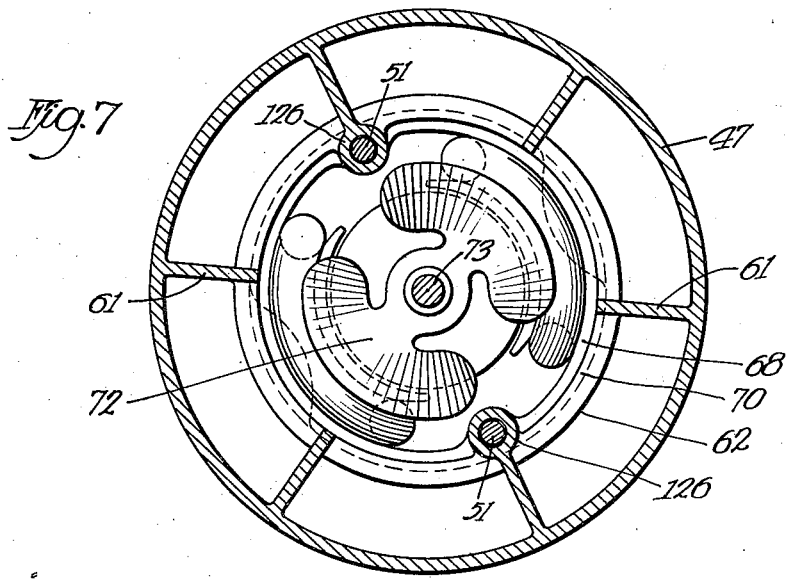
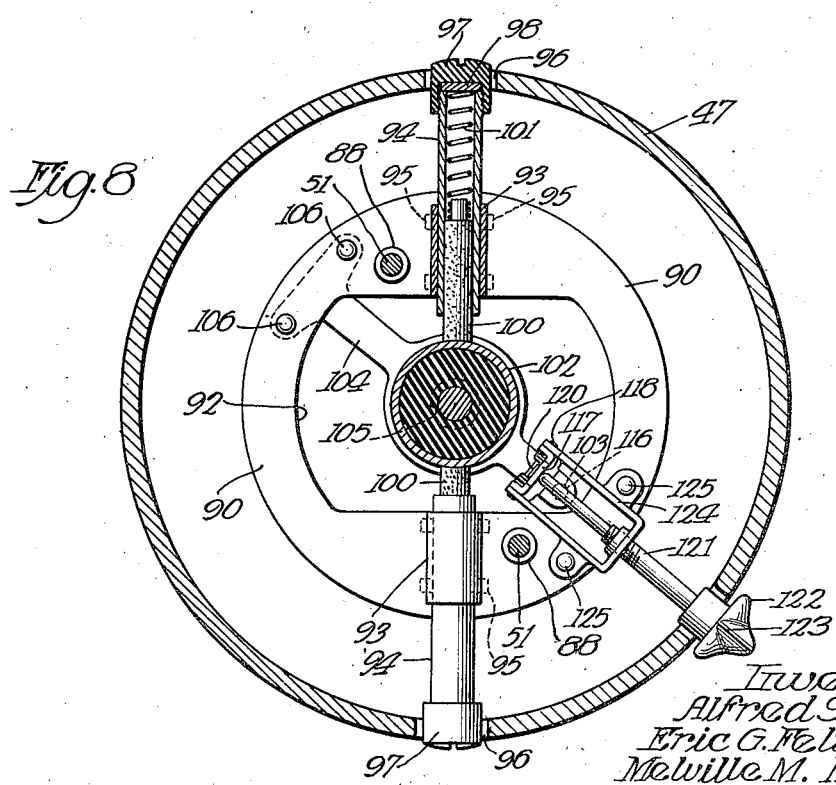

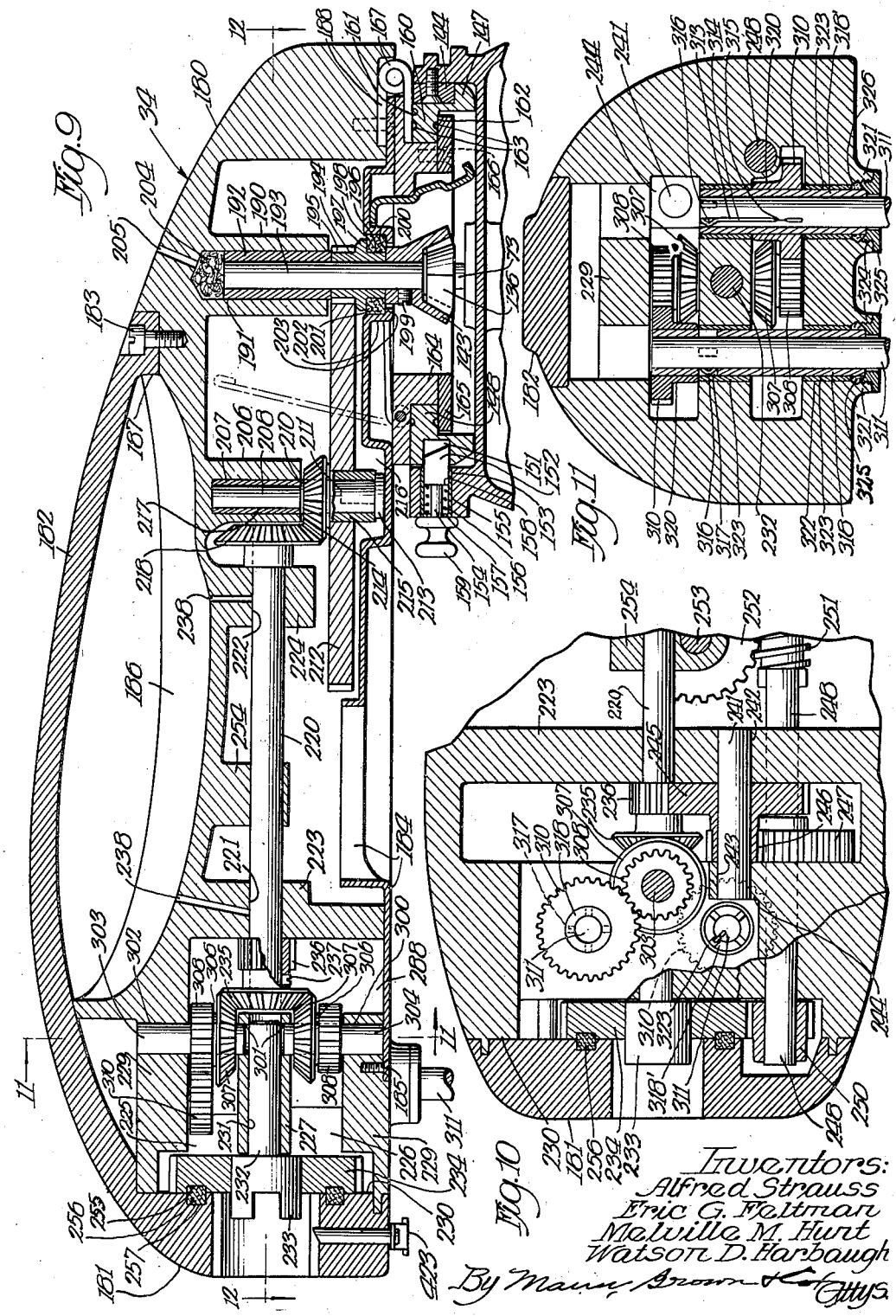

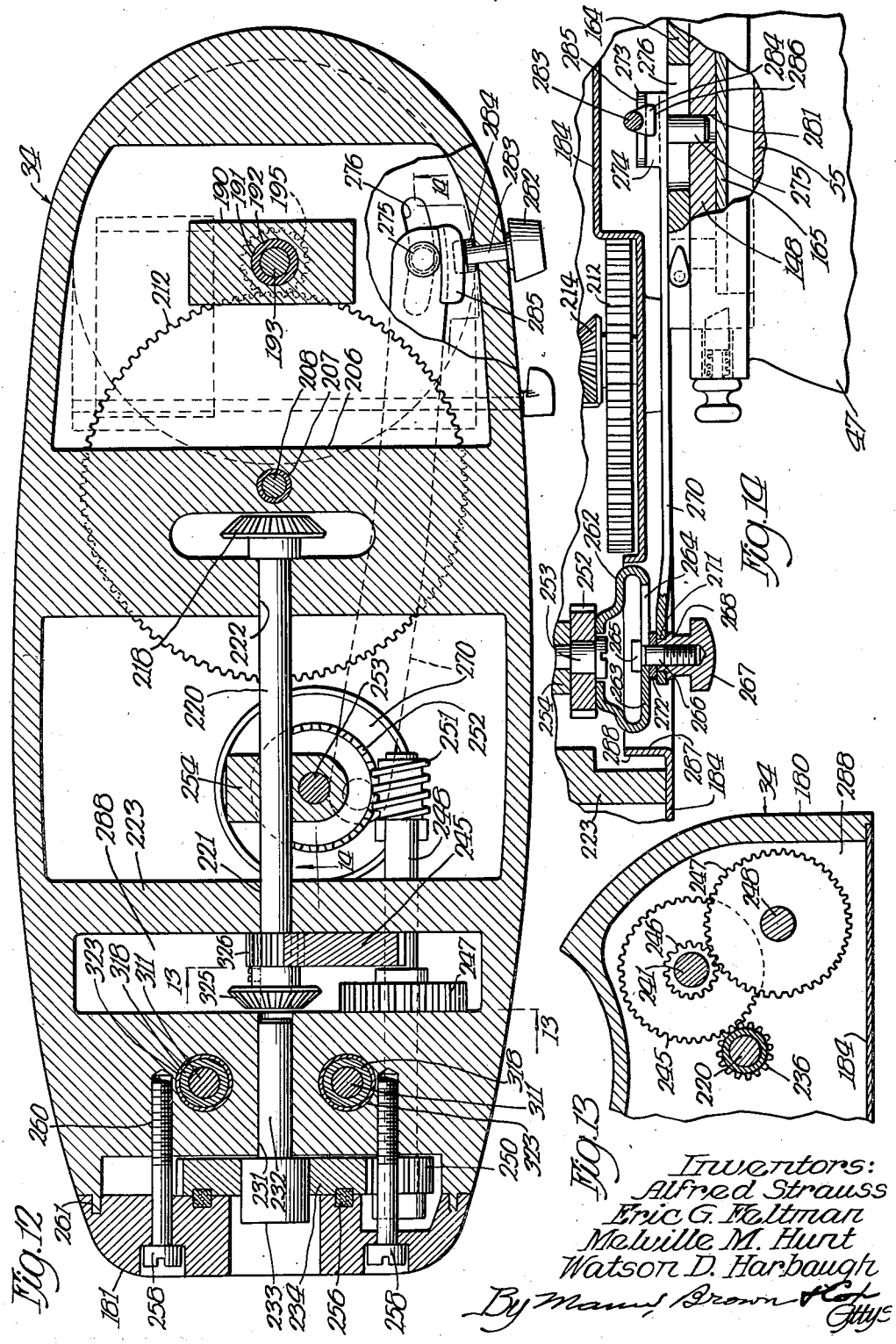

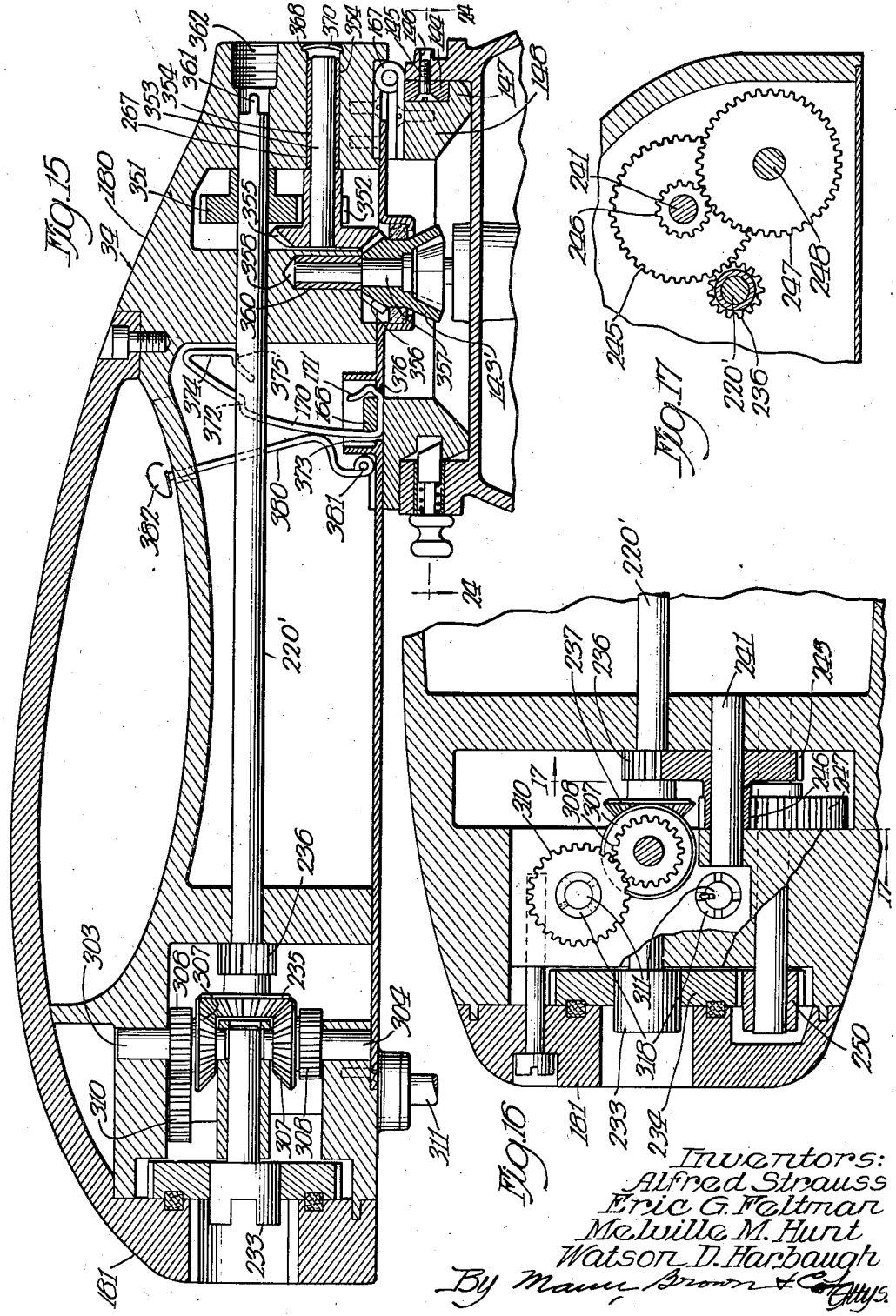

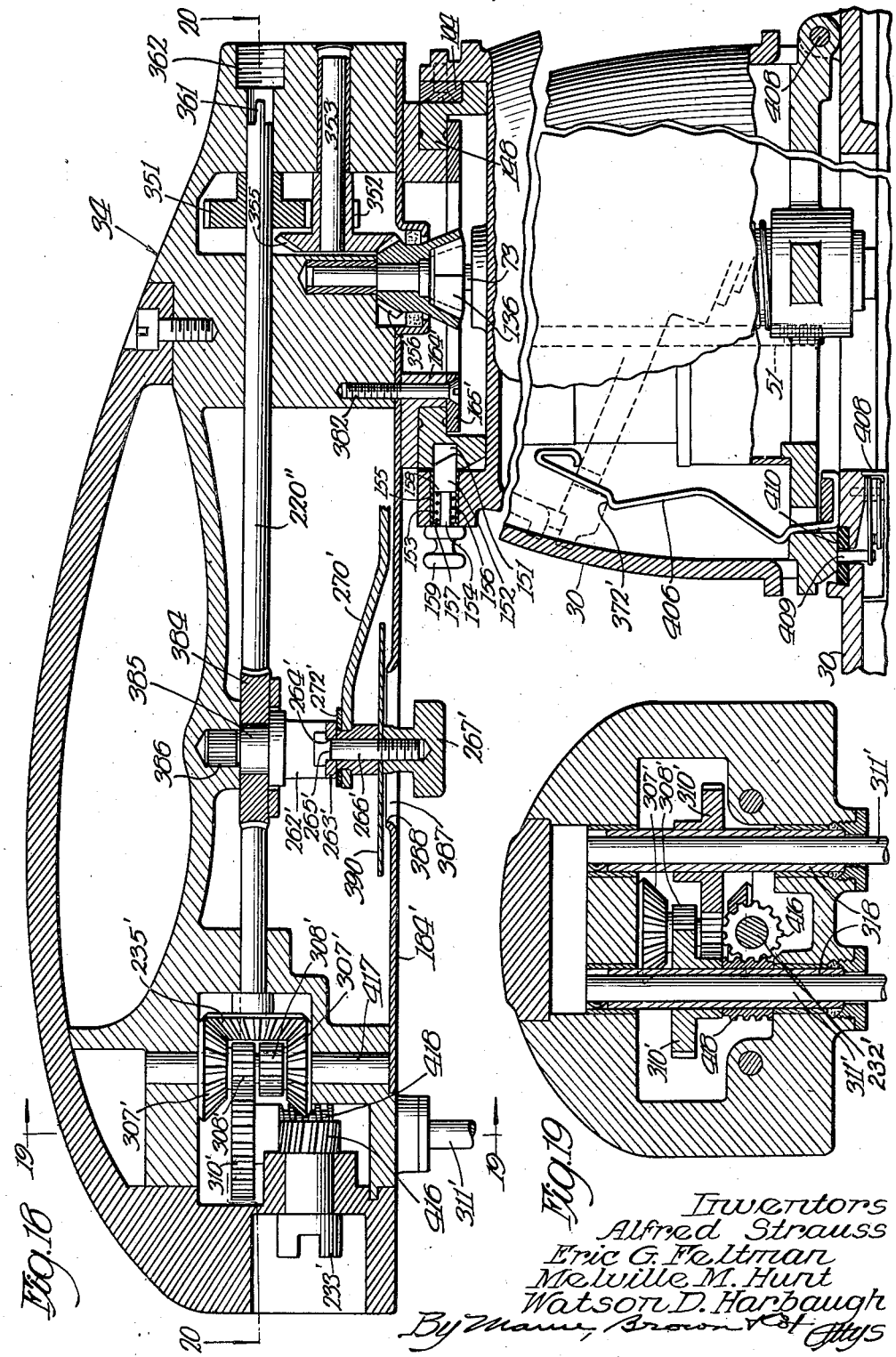

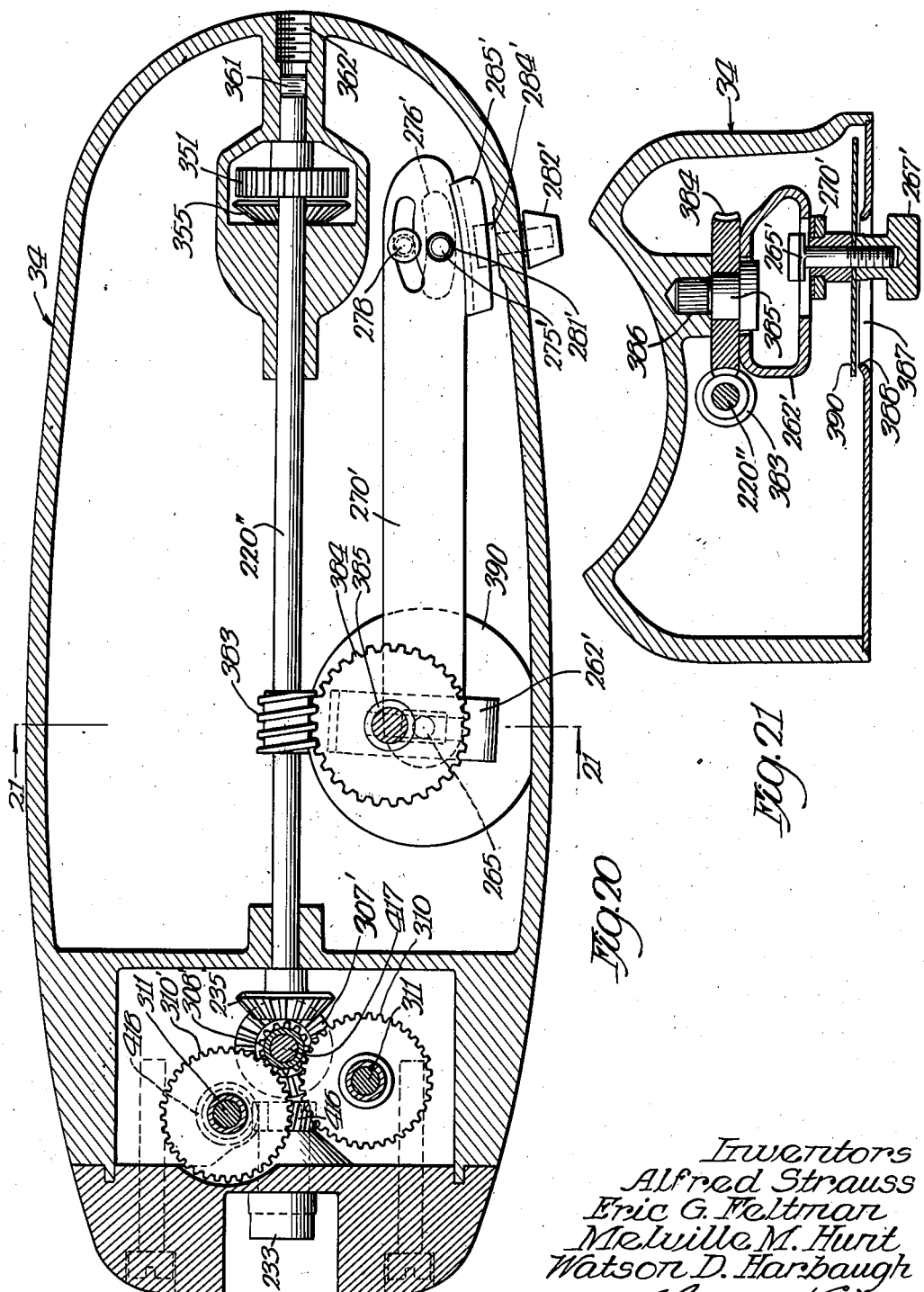

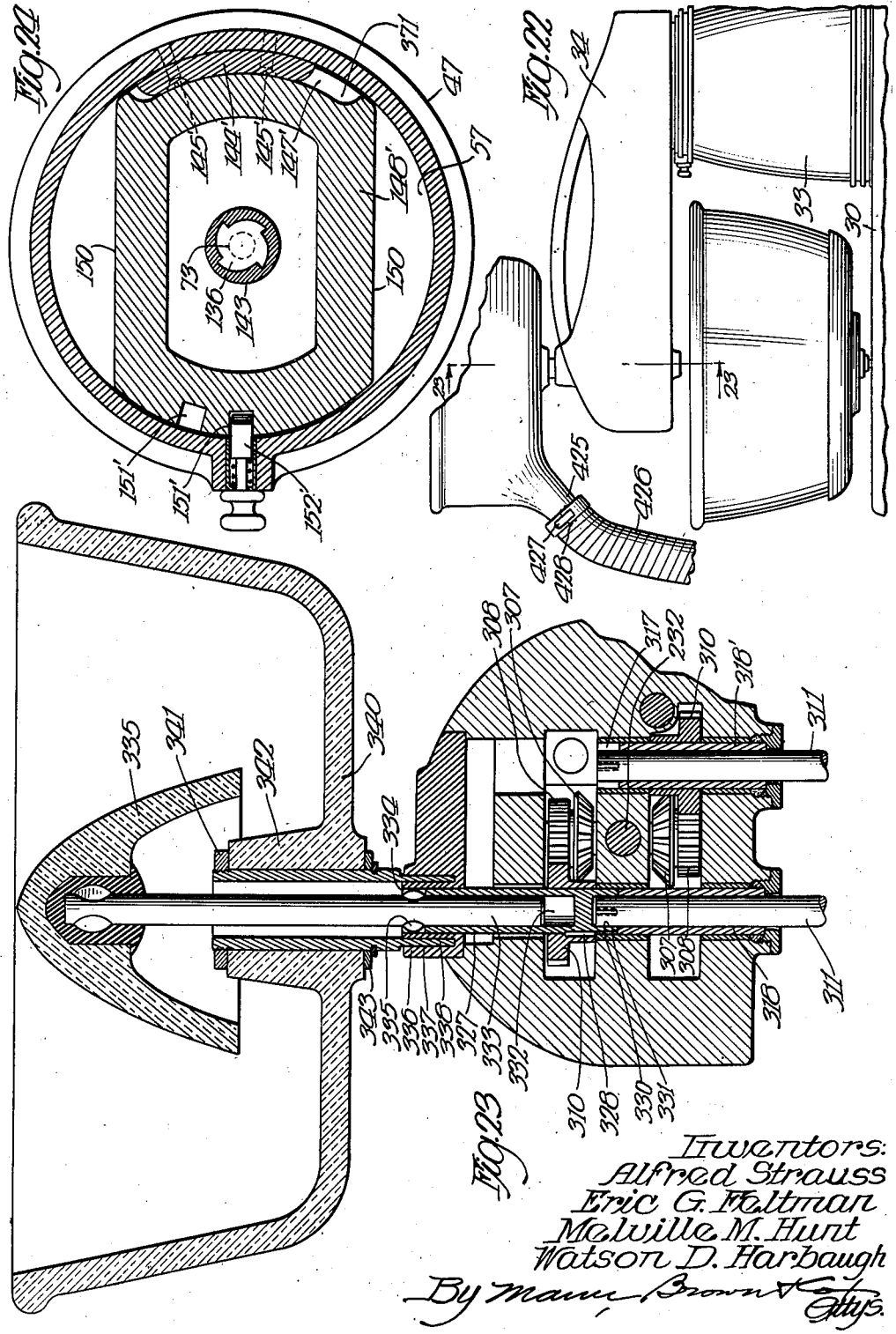

March 31, 1942. A. STRAUSS ET AL 2,278,187
FOOD PROCESSOR
Filed Jan. 8, 1940 11 Sheets-Sheet 11
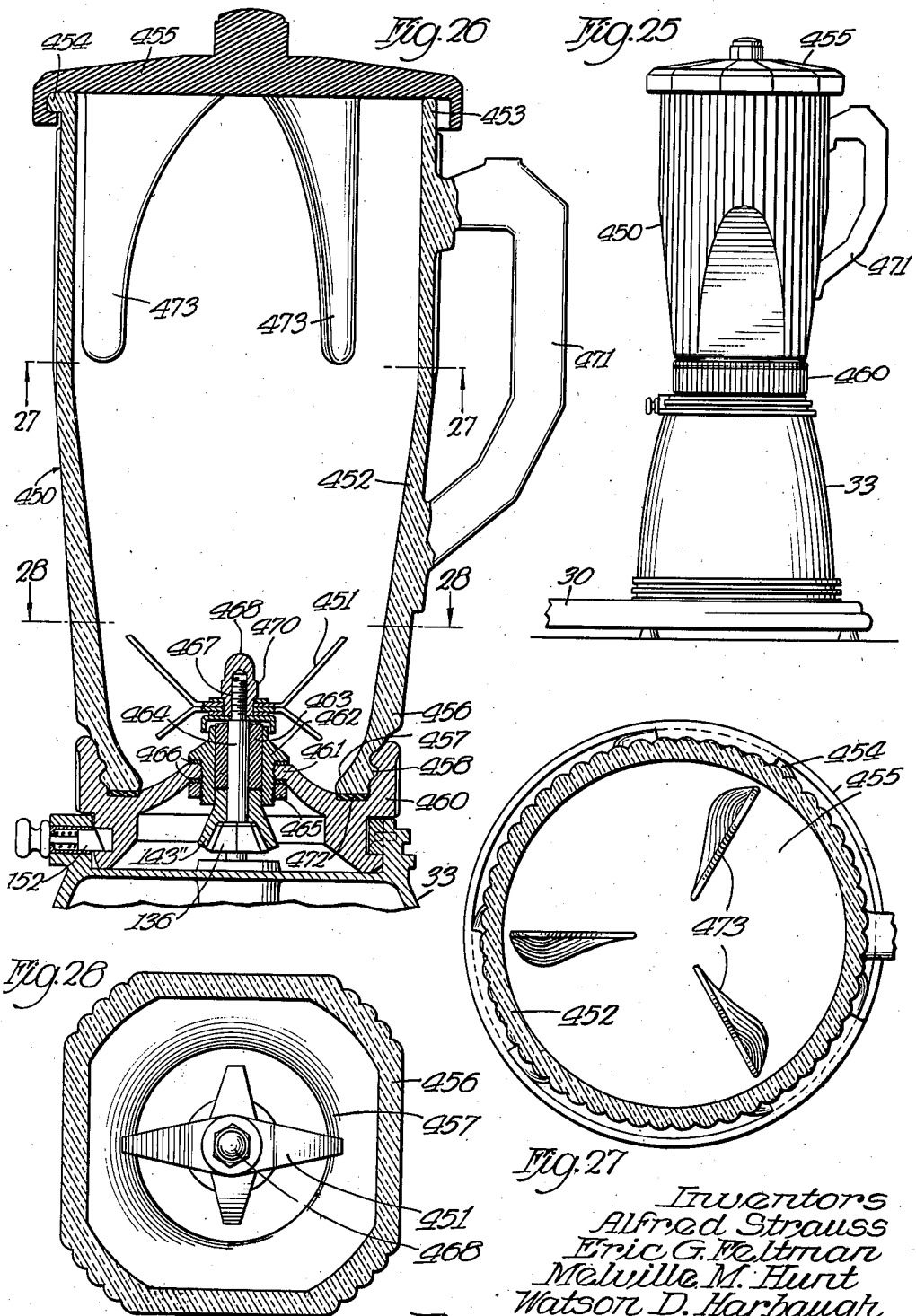
Inventors
Alfred Strauss
Eric G. Feltman
Melville M. Hunt
Watson D. Harbaugh
By Mann, Brown & Co Attys.

Patented Mar. 31, 1942

2,278,187

UNITED STATES PATENT OFFICE 2,278,187

FOOD PROCESSOR

Alfred Strauss and Eric G. Feltman, Chicago, Melville M. Hunt, Park Ridge, and Watson D. Harbaugh, Chicago, Ill., assignors to A. F. Dormeyer Mfg. Co., a corporation of Illinois Application January 8, 1940, Serial No. 312,874

13 Claims. (Cl. 259—13)

The present invention relates to food processing devices and more particularly to food mixers, liquifiers and juice extractors.

It has been the practice to build food processing devices of the class described with the motor casing and the beater and beater drive assembly fashioned as a single unit. Although this has many advantages evidenced almost without exception, by the many mixers upon the market, the advantage of lifting the motor from the standard for mixing food at a point remote from the mixer base, entails the lifting and handling of a heavy article which is very tiresome. In the present invention only the weight of the gear housing is encountered for this purpose. The gear casing can be separated as a unit from the heavy motor parts and constitutes the only part that has to be lifted and handled for remote mixing.

In accomplishing this, we prefer to provide a detachable flexible drive interconnecting the motor and the movable part. By providing the detachable drive, other tools, such as wood carvers, buffers, silver polishers and grinding wheels may be substituted for the beaters upon the beater gear housing or be connected directly to the flexible drive without the housing and other types of food processing units can be driven direct from the motor interchangeably with the housing and the flexible drive. In such instances supports may be provided for the tools or gear housing if they are to be stationary, and, if not, the selected tools may be suitably conformed so that they can be easily handled in operation.

Moreover, with conventional processors, the food contents of the bowl are easily spilled or are not confined to close cooperation with the rotary tools acting upon the contents in a container. A source of spilled contents arises where the bowl or the contents are rotated indirectly through the reactance of the beaters and the inertness of the mixture. In one case the spinning bowl revolves more and more rapidly and the contents centrifugate up and over the edge of the bowl. In another case, the spin of the bowl is enough to centrifugate the major portion of the food away from the rotary tools and lower their relative efficiency. Although these have been controlled in different ways such as by imposing a drag upon the bowl this retards the mixing effectiveness in the first instance and often in controlling the second instance, changing the angle of the sides of the bowl which reduces access to the bowl for introduction of ingredients.

In some conventional constructions the bowl is moved manually upon the base in a way regulating the whirling of the bowl by lessening the degree of reactance of the propelled mixture against the bowl side but this requires the use of a hand when a housewife may need both hands for other tasks and has not been entirely satisfactory, movement of a turntable from one position to another for the purpose of utilizing bowls of different sizes being something else.

In the present invention, we provide a means for automatically reciprocating the beaters in a bowl from one side of the bowl to the other continuously through any adjusted distance at a slow rate, whereby the bowl will be rotated several turns in one direction and before it has a chance to attain a dangerous speed, move the beaters near the other side for a brief period and cause the bowl to rotate in the opposite direction, in the meantime passing the beaters back and forth over the center of the bowl to remove any collection of unmixed ingredients that generally collect at the center of large bowls outside of the sweep of revolving fixed beaters.

Moreover, very often the motor would not be turned off when the beaters were raised. As a result, the mixture clinging to the beaters would be whirled and splattered over everything nearby. It is the intention of the invention to prevent this happening. In doing this, we stop the motor automatically when the beaters are raised a certain distance and start the motor again automatically when it is lowered past a predetermined level.

Another object of the invention is to provide an improved transmission in which the beater shafts may be located or changed for manufacturing purposes through an arc of 90°, i. e., they may be located square across the gear housing or they may be slanted as much as 45° either direction in diagonal positions.

A further object of the invention is to provide an improved elongated gear housing and gearing therein where two or more power take-offs are had in different directions with one or more power inputs also in different directions.

Another object of the invention is to provide gearing wherein a reduction from a very high motor speed is accomplished quickly from the first shaft without worm gearing and the remaining shafts may be journalled directly in die cast metal.

Another object is to provide an improved pivotally mounted gear housing wherein torsional and flexure strains are borne in an improved manner by a tie member or spanner serving also as a handle.

Another object of the invention is to provide an improved mounting for a motor wherein vibrations induced by a detachable gear housing are dampened and vibrations induced by the motor are transmitted to a detachable liquifying container to assist in the circulation of solid objects in the container.

Another object of the invention is to provide an improved motor unit interchangeable with different attachments including a motor casing which is cooled in an improved manner without transmitting heat to the attachments and gear housing.

Another object of the invention is to provide an improved arrangement between a motor developing heat in its operation and a gearing unit wherein the heat and lubricant viscosity in the gear housing is practically unaffected by heat developed in the motor.

Another object is to provide an improved speed governor and brush mounting for an electric motor and an improved blower having minimized noise characteristics at high speed for cooling the motor parts.

Another object is to provide an improved motor unit, an improved gear housing, an improved liquifier, and an improved interchangeable relationship between the gear housing, the liquifier and the motor unit.

Moreover, in the present invention an improved mounting for a food liquifying container and a handle therefor for ease in handling are provided and so constructed that the container cannot be dislodged inadvertently from its mounting on the motor or readily slip from the hands of one handling the container as when pouring the contents from the container, it being also a further object that the liquifying container can be readily cleaned with ready access to all places where food particles are apt to collect.

A further object of the invention is to provide an improved cover for the liquifier container which cooperates with the spinning cutters to return the peripherally swirled contents to the center of the container and to the cutters, and, as a further object, that this be done to a degree in direct relation with the depth of the liquid in the container so that at low levels the blades will froth the contents while at high levels the induced air content will be comparatively less.

Another object of the invention is to provide an improved oscillation control for moving rotating beaters back and forth in a mixing bowl.

Another object is to provide an improved shaft arrangement for driving beaters and a juicer.

A further object is to provide an improved juice catch whose outlet is normally beyond the edge of the bowl on the motor base, with a flexible non-corrosive tube attached thereto for directing the contents of the juice catch into any one of a number of containers within the reach of the tube.

Another object of the invention is to provide an improved circuit interrupter speed control governor and control therefor which can be used in connection with a food liquifier.

Another object of the invention is to provide an improved drive connection which may be disengaged and engaged at will without any attention to pre-alignment, and with a wide tolerance for out of alignment conditions which might arise due to the manufacture of heterogeneously fitting parts and interchangeability.

Another object is to provide an improved power unit for food processing devices that is provided with self-aligning bearings at both ends of the shaft.

Another object of the invention is to provide a powered food mixer having a low center of gravity and a greater stability against being upset or knocked over.

Another object of the invention is to provide a food processing device which is simple and rugged in its construction, efficient in its purpose and use, inexpensive to manufacture and easily operated and adjusted by persons inexperienced mechanically.

These being among the objects of the present invention, other and further objects will become apparent from the drawings, the description relating thereto and the appended claims.

Referring now to the drawings:

Fig. 1 is a side elevation of an embodiment of the invention illustrating, partly in broken lines, two different positions the beaters may be disposed in when the embodiment illustrated is placed in use;

Fig. 2 is a side elevation showing the embodiment illustrated in Fig. 1 as arranged and used when it is desirable to use the beaters at a point remote from the power unit;

Fig. 3 is a side elevation of the embodiment illustrated in Fig. 1 as it appears when a food chopper attachment is employed therewith;

Fig. 4 is a vertical section through the power unit taken upon the line 4—4 in Fig. 1;

Fig. 5 is a horizontal section through the universal coupling between the gear housing and the motor unit as taken upon the line 5—5 in Fig. 4;

Fig. 6 is a vertical section taken through the power unit and a portion of the gear housing upon a plane running longitudinally with the gear housing as indicated by the line 6—6 in Fig. 4;

Fig. 7 is a horizontal section through the power unit near the top thereof as taken upon the line 7—7 in Fig. 6;

Fig. 8 is a horizontal section through the power unit as taken upon the line 8—8 in Fig. 6;

Fig. 9 is a vertical longitudinal section through the gear housing illustrating the preferred form of the invention including the means by which the gear housing is pivotally secured to the top of the power unit;

Fig. 10 is a horizontal section taken upon several planes through the overhanging portion of the gear housing as viewed from above;

Fig. 11 is a vertical section taken transversely through the gear housing upon the line 11—11 in Fig. 9;

Fig. 12 is a horizontal section through the gear housing as taken upon the line 12—12 in Fig. 9;

Fig. 13 is a vertical transverse section through a portion of the gear housing as taken upon the line 13—13 in Fig. 12;

Fig. 14 is a vertical longitudinal section through a portion of the gear housing shown in Fig. 9 as taken upon the line 14—14 in Fig. 12;

Fig. 15 is a vertical longitudinal view through the gear housing and the top portion of the power unit illustrating another embodiment of the invention;

Fig. 16 is a sectional view of the front portion of the embodiment illustrated in Fig. 15 taken mainly upon one horizontal plane with certain portions sectioned upon other horizontal planes;

Fig. 17 is a transverse section taken upon the line 17—17 in Fig. 16;

Fig. 18 is a view similar to Figs. 9 and 15 illustrating another embodiment of the invention, namely, a vertical section through the gear housing and included therewith a slightly reduced section through the motor unit showing how the gearing housing is mounted for tilting movement;

Fig. 19 is a vertical transverse section of the gear housing illustrated in Fig. 18 as taken upon lines 19—19 in Fig. 18;

Fig. 20 is a horizontal section through the gear housing illustrated in Fig. 18 as taken upon the lines 20—20 therein;

Fig. 21 is a section taken upon the lines 21—21 in Fig. 20;

Fig. 22 is a side elevation similar to Fig. 1 showing the gear housing as constructed to receive a fruit juicing attachment thereon;

Fig. 23 is a transverse section taken upon the lines 23—23 in Fig. 22;

Fig. 24 is a horizontal section taken upon the lines 24—24 in Fig. 15 through the top of the power unit;

Fig. 25 is a side elevation of the power unit with a liquifier attachment in place thereon;

Fig. 26 is a vertical section through a liquifier attachment for the power unit taken upon a vertical plane coinciding with the axis of the power unit;

Fig. 27 is a section through the liquifier bowl taken upon the line 27—27 in Fig. 26;

Fig. 28 is a section taken upon the line 28—28 in Fig. 26.

In the present invention a food mixer is provided in which a base 30 has mounted at one end thereof a turntable 31 supporting a bowl 32 thereon, and, at its other end, an upright power unit 33 supporting at the top thereof a gear housing 34 carrying depending beaters 36 which extend down into the bowl 32 when the gear housing 34 is in its lowered position as indicated by the numeral 37, as distinguished from its raised position as indicated at 38 in broken lines. A handle for managing the gear housing is shown at 35.

As best shown in Figs. 4 and 6, the base 30 constitutes a die cast metal unit having downwardly depending flanges 40 with bosses 41 therein to receive rubber feet 42 that are secured thereto by machine screws 43. The base 30 is webbed, as at 44, over the lower face thereof for structural rigidity, and at the front end is provided with a reamed boss (not shown) to journal the spindle 45 of the turntable 31.

At its rear end the base is provided with an integral ring 46, preferably concentric with the housing 47 of the power unit. The ring 46 provides an opening 48 large enough for the free exhaust of air therethrough employed in cooling the motor parts, and also to provide room enough to receive certain parts of the motor assembly for the sake of compactness. Diametrically opposite each other on the ring two drilled and threaded holes 50 are provided to receive the vertical assembly bolts 51 which hold the elements of the power unit together as an assembly and also secure the unit to the base. The power unit 33 comprises a die-cast part having a shell 47 of a curvilinear, upwardly tapering contour which is open at the lower end, where the marginal edge 53 is staggered to provide openings 54 when the lower edge 53 is lowered against a member having a flat face.

The upper ends of the shell 47 are closed by an integral horizontal wall 55, spaced from the upper edge 56 a slight distance to provide an upwardly opening cylindrical cavity 57.

At its center the wall 55 is provided with a boss 58 structurally reinforced by radial webbing 60 which extends to the sides of the shell 47 and downwardly as ribs or fins 61 integrally therein as a part of the inner edges of the fins 60.

The boss 58 is bored to receive, in supported relationship, a self aligning bearing comprising a washer 63 resting upon a shoulder 64 at the bottom of the boss and a bearing member 65 held in universal engagement with the washer 63 by a spring 66 placed under tension by a collar 67 threaded into the upper end of the boss 58.

An annulus 62 is cast integrally with the inner edges of the fins 61 and the annulus 62 is reamed to receive the stator 68 of the motor as limited by a shoulder 70 left in the reaming operation near the upper end of the annulus 62 at a place to locate the stator a predetermined distance from the end wall 55.

It will be seen from the description thus far that the stator 68 when fit into the ring 62 is brought into heat transfer contact therewith whereby heat developing in the stator is conducted directly to the reinforcing fins 61 and ribs 60. The inner contour 71 of the shell 47 is formed to provide a streamlined passageway for air flowing in through the opening 54 and upwardly over the fins 61 to the top of the shell. From there the air passes radially inwardly with full freedom of movement over the upper end of the ring 62 where it is driven by the fan 72 mounted upon the armature shaft 73, downwardly and centrally through the stator 68 and outwardly to the outside again through the openings 48. At no time is the air stream in a position to contaminate food in the bowl and the air is in contact with the outside of the heated parts as well as passing through them.

At its lower end 52 the shell 47 is supported upon an intermediate member 74 comprising a plate circumferentially shouldered at 75 to receive end portions 53 of the shell 47. At its peripheral edge the plate is made solid to form part of the passageway of the cold air while at its center it is webbed, as at 76, to permit the downwardly passing air access to the opening 48. The webbing at 76 is made of radial portions providing a spider supporting a bearing boss 77 at the center thereof somewhat similar in construction to the boss 58 at the top.

The bearing boss 77 is reamed out from the bottom to leave a shoulder 78 at the top thereof which receives a compression spring 80 which holds bearing 81 in universal engagement with a plug 82 threaded as at 83 into the bearing boss 77.

In addition to supporting the bearing 81 the plug 82 supports, in adjustable relation, a ball end-thrust bearing 84 for the shaft 73.

The intermediate member 74 is in turn supported upon the shouldered washer 85, made of live rubber, which dampens the transmittance of all sound and vibration to the base 30 from the intermediate members 74 including the shell 47.

The washer 85 is prevented from slipping sidewise by a shoulder 86 formed as a part of a recess 87 into which the washer is pressed upon the upper surface of the base 30.

It has already been mentioned that the bolts 51 secure the shell 47 to the base 30. It is upon these bolts that the remaining motor parts, other than the armature, are supported as a unit and held in spaced relation by sleeves 88 and 89.

This unit comprises an improved brush governor unit made up of a pressed plate 90 composed of electrical insulating material which is apertured as at 91 to receive the bolts 51 and upon which the other parts are mounted.

As more particularly shown in Fig. 8 the plate 90 is circular with a large central aperture 92 to permit free circulation of air therethrough. Upon the upper side of the plate 90 at diametrically opposed points, U-shaped brackets 93 secure brush holders 94 in place by fingers 95 extending through the plate where bent over portions upon the lower side thereof clinch the brackets and holders in place. The brush holders 94 are tubular, being preferably made of brass with an irregular outer contour preventing their turning when held by the brackets 93. The tubes 94 extend to the wall of the shell 47 where apertures 96 are provided to receive kerfed Bakelite caps 97. The caps 97 removably support brass disks 98 at the outer ends of the tubes where the disks provide an electrical contact between the tube 94 and the compression springs 101 which contact and hold the brushes 100 against the commutator 102. Electrical connections in the motor circuit are made through leads running to the brackets 93. This construction provides for a ready assembly and removal for the installation and repair of the brushes.

Upon the lower side of the plate 90 the parts of the circuit breaking centrifugal governor are mounted. The movable contact 103 thereof (see Fig. 6) is mounted upon a spring bar 104, which is apertured as at 105 to encompass the shaft 73 and secured to the plate 90 as by riveting 106.

The contact bar 104 is moved back and forth in response to variations in the motor speed by centrifugal weights 107 pivotally mounted at 108 upon a plate 110 press fitted or secured against the commutator 102. The centrifugal weights 107 are all shaped with a bell crank end portion 111 pressing against an axially movable disk 112 having a ball bearing engagement with a follower 113 keyed against rotation by fingers 114 upon the contact bar 104. The train of elements just described are collapsed against the exercise of the centrifugal force mentioned by means of a compression spring 115 between the bar 104 and the bearing boss 77.

Beneath the contact 103 and cooperating therewith is a manually movable contact 116. The contact 116 is mounted upon a bell-crank 117 by a pivot pin 118, carrying a torsion spring 120 urging the contact 116 toward the contact 103. The limit of movement permitted the contact 116, and its adjustment is accomplished by means of a coarsely threaded shaft 121 extending through the wall of the shell 47, where it receives a handle 122 with an indicator 123 thereon. The shaft 121 and the pivot pin 118 are supported in a single metal stamping 124, riveted, as at 125, to the upper face of the plate 90.

The brush governor assembly thus described is neat and compact, the unit is readily assembled outside of the motor housing, and easily placed in the motor housing between the sleeves 88 before the bolts 51 are inserted in place, one cap 79 being inserted through one opening 96 before the other cap is raised to position, it being optional whether the brushes are assembled before or afterward.

In assembling the motor unit the casing or shell 47 is turned bottom side up after the self-aligning bearing 65 is assembled and secured in place. The bolts 51 are then inserted upwardly through cylindrical bosses 126 integral with the end wall 55. Adjacent the heads 127 of the bolts cylindrical rubber sleeves 128 are provided to fit in an enlarged recess 130 in the bosses 126. The sleeves are flanged radially, as at 131, to provide a vibration dampening washer-like member fitting snugly between the head 127 of the bolt and the upper face of the end wall 55. The opening 132 in the boss 126 below the washer 128 is widened to receive the bolt with a wide clearance so as to prevent metal to metal contact at this point.

The stator 68 is then inserted in place and comes to rest against the ends 133 of the bosses 126 and the shoulder 70. The armature 73 is then lowered into place with the upper end lowered through the self aligning bearing 65.

The upper sleeves 88 are slipped in place to act as spacers for the brush-governor unit, and after the governor unit is located in place, the lower sleeves 88 are slipped over the ends of the bolts 51, air flow control sleeves 134 being located upon opposite sides of the unit to prevent recirculation of cooling air inside the shell 47.

Thereafter the spider 74 is disposed in place; the vibration dampening washer 85 assembled therewith, and the base 30 inserted to mate with the rubber washer 85 where it receives, in threaded relation, the threaded ends of the bolts 51.

After the bolts 51 have been tightened the motor unit and base are turned right side up to receive preferably the male member 136 of a quadrate universal joint. The male member 136 comprises a beveled element swaged on the armature shaft 73 as at 137 (Fig. 6) to be driven thereby. The member 136 is provided with four radial faces 138 connected with tapering sides 140 running from the apex 141 of one radial face to the inner edge 142 of the adjacent trailing face. It is through this member 136 that the power of the motor is transmitted to the gear housing 34.

The member 136 drives a female member 143 carried by the gear casing 34 which mates with the member 136 with adequate radial clearances to allow for misalignment of the supporting shafts normally expected to occur in the manufacturing tolerances of the two parts. The radial faces upon the teeth of the male member face in the direction of rotation and the radial faces upon the female member face in the opposite direction to be driven by the first.

Although any number of faces may be provided, it is preferable to have four disposed at right angles to each other. In this way the universal action developed by an Oldham coupling is made available in a new and novel manner in food mixers. The faces mating between the members at all times permit free slippage radially without a binding that would interfere with the free movement required. Moreover the contour of the teeth as provided is such that the male and female members may be separated and brought together with minimum interference in making the drive joint. The taper of the bevel is so designed in relation to the radial dimensions of the face that they permit arcuate engagement and disengagement with immediate mating without interference between the members as they are moved relative to each other.

The cavity 57 in the top of the motor housing 31 is provided with a block 144 disposed at the rear thereof flush with the top 56 where it is held in place by screws 145 threaded into the wall of the cavity at 146. This block provides an anchorage for an outwardly extending lip 147 provided upon a collar 148 whose axial cross sectional contour, in this embodiment, is similar to that shown in Figs. 6 and 18. The radial contour of this element is similar to that shown in Fig. 24, where it is flattened at the sides 150 (Fig. 4) to permit inclined downward and rearward insertions of the lip 147 under the block 144 with minimum tilt.

At its front side the collar 148 is drilled out as at 151 where it receives a snap latch 152 reciprocally mounted in a radial bore 153 disposed in the front of the wall of the cavity 57. The latch comprises a reduced intermediate portion 154 over which an inwardly flanged sleeve 155 is slipped with an expansion spring 156 acting between a flange 157 upon the sleeve and a shoulder 158 upon the latch to force the latch inwardly. The latch is controlled by a handle 159 swaged upon the outer end thereof after the sleeve and spring are assembled. The sleeve fits tightly in the bore and thereby holds the latch in latching position when once assembled in place. In this way the collar is locked in place in the cavity 57.

The inside contour of the collar 148 comprises an inwardly extending flange 160 providing upper and lower bearing surfaces 161 and 162 respectively grooved as at 163 to receive lubricant.

These bearing surfaces support against axial displacement and tilting, a head 164 following the contour of the upper surface 161 and inner surface of the flange 160 with a retaining ring 165 resting against the lower face 162 where it is held against the head 164 by means of screws 166.

Thus, whenever the collar is inserted into and secured in the cavity as by the latch 152, the head is rotatable with respect to the motor unit.

In this embodiment, the gear housing is secured to the upper surface of the head by means of a hinge 167 and an upwardly extending locating eyelet 168 supporting a spring 170 having a snap portion 171 for holding the gear casing down against all but willfully applied forces that are intended to raise the gear housing and pivot it about the hinge.

Before describing the gear housing in further detail it may be well at this time to point out that the head is provided with an arcuate slot 172 which receives a pin 173. The pin 173 is reciprocally mounted in the collar and urged by a spring 174 to an upper limit where the pin extends above the head. As best shown in Fig. 6, when the gear housing is lowered against the upper end of the pin, the pin is driven downwardly. The lower end of the pin controls a normally open switch whose one pole 175 assists the spring 174 in urging the pin upwardly. The switch 176 is connected in the motor circuit to stop the motor whenever the switch is open.

With this construction, whenever the gear housing is raised, such as when it becomes desirable to remove the beaters from the bowl, the motor is stopped, preferably before the universal joint 136 is broken. This prevents motors, such as the series wound motor, preferably used in the embodiment, from running without a load and stops the beaters. When the beaters are lowered again the universal joint is engaged before the switch is closed. Thus, the motor never runs without some load, and, as a further advantage, the make and break switch prevents the food mixture, clinging to the beaters, from being thrown out over the edge of the bowl as the beaters leave the level of the liquid in the bowl when the beater housing is raised. This obviates dangers conventionally experienced with mixers which are not shut off when the housewife tilts the beaters to remove them from the bowl.

Referring now to the transmission, like numbers will be used to designate similar parts throughout the several embodiments as far as it is practical. In those instances where parts are similar in functions or results but otherwise are only slightly different in construction, they will be identified by the same numeral but distinguished with respect thereto by the use of prime marks.

Throughout the several views, the gear wheels have been shown with straight cut teeth, for purposes of convenience, but in all instances we prefer to use curve cut teeth, such as helical teeth, for the sake of quietness, and in all cases where it is possible to provide a fiber or composition gear meshing with a metal gear.

The preferred embodiment of the transmission housing and gearing is shown in Figs. 9 to 14. Referring now to Fig. 9, a gear housing 34 is shown as made of three parts, the main housing 180, a front nose member 181 having an integral rearwardly extending portion providing a handle 182 which is secured at its rear end to the housing 180 by a screw 183, and a cover plate 184 for the bottom of the main housing 180 which is secured in place by screws 185.

Although the gear housing 34, as an assembled unit, may be constructed in more than three parts, we prefer the construction shown wherein a minimum number of parts can be die cast, annealed to remove stress, and machined with little, if any, danger of misalignment in bearings and clearances. The parts provided are so constructed and arranged that only two pull-out dies need be used in the casting operation of the main frame 180 and only one pull-out die need be used with any of the other parts.

Moreover, the gear housing 34 is designed so that the major portion of the machine operations thereon may be performed in two planes and the material and openings are so distributed and formed that adequate clearance and head room for the assembly and operation of the gears and shafting may be had to the best advantage.

Referring now to the main housing 180 as though the top were the back and the bottom the front thereof, following the die casting terminology, the back of the housing is provided with a depression 186 for the reception of the fingers of a person's hand in manipulating the handle 182. Both the handle 182 and the housing 180 are recessed and conformed at the end thereof and held by the screw 183 along the line of juncture 187 to provide a flush joint having a smooth outer contour which fits in with the streamlining of the housing as designed to provide a pleasing appearance.

Viewed from the front, the casting is somewhat cup-shaped with transverse partitions therein of different heights connecting the sides, and with upstanding studs between the sides to the right of the center of the housing, as viewed in Fig. 9.

The margins of the cup-shaped portions in the housing are recessed to receive the edges of the cover plate 184 and the top butt plate 188 of the hinge 167. The rearmost 190 of the studs is bored, as at 191, to receive a bearing sleeve 192 that journals the shaft 193 carrying the female member 143 of the universal joint. The bearing 192 is press fitted into the bore 191 and the overall length of the stud 190 is such as to accommodate a pinion gear 194 between the ends of the bearing and the female member 143.

The pinion gear 194 comprises helical gears 195 upon the upper side thereof and a reduced cylindrical portion 196 at the lower end thereof divided from the teeth 195 by a radial flange 197 having a squared shoulder 198 on the bottom thereof. The upper end of the female member 143 is secured to the shaft by the set screw 199 and is squared to provide a shoulder 200 opposing the shoulder 198 in a manner providing a groove therebetween in which a grease seal or packing ring 201 is located.

In cooperation with the grease packing ring and the shoulders 198 and 200, the cover plate 184 is die cast to provide a cylindrical portion 202 holding the grease ring 201 in place. A shoulder 203 through the cooperation of the packing ring supports the shaft 193 and the parts assembled thereto against inadvertent removal from the housing.

The helical teeth 195 have only a slight angle, either right or left, depending upon the direction of rotation of the armature and the angle is turned to provide an end-thrust which will carry the weight of the shaft 193 under normal operating conditions. When the gear housing is lowered the weight of the shaft 193 and assembled parts is borne also, in some measure, by the male member 136 which in turn is supported against thrust loads at the bottom of the armature shaft by the ball 84.

With this arrangement there is enough freedom of movement longitudinally between the shafts to permit to them their best cooperation without vibration and binding, and, in view of the fact that the shaft 193 is operated at full armature speed, in some instances, as high as 18,000 revolutions per minute, we provide a recess at the top of the bore 191 with an oil wick 204 which is supplied with light oil through an oil passageway 205.

Spaced from the stud 190 is a second stud 206 into which is press fitted a sleeve 207 and a rigid shaft 208. The shaft 208 has a reduced portion for the press fit and a shoulder 210 which limits the depth to which the shaft may be forced into place. The exposed surface of the shaft 211 provides an axle which is machined to receive a gear wheel 212 rotatably thereon and the wheel is held in place by a cap screw 213 threaded into the end of the axle. The wheel comprises a beveled gear 214 having a hub 215 upon which the helical gear 212 is press fitted to mate with the drive gear 195 upon the shaft 193.

For purposes of lubricating these parts and also for purposes of strengthening the cover plate 184, the plate is die cast with a transverse channel 216 in which lubricant may collect and be picked up between the lower end of the hub 215 and the head of the cap screw 213, the head of the cap screw resting against the bottom of the channel and the bottom of the channel resting against the collar 164 on top of the motor housing. This construction and arrangement not only provides a means for lubricating the gear 211 but also provides a direct and solid support point for the weight of the housing overhanging the bowl 32.

Upon its left side, as viewed in Fig. 9, the stud is fastened, as at 217, to provide clearance and head room for a beveled gear 218 driven by the beveled gear 214. The mounting of the gear 218 is accomplished by securing it to the rear end of a horizontal shaft 220 inserted from the left end of the housing, the shaft 220 extending through three cuts after having been inserted through a fourth.

For a better understanding how these cuts are made, it would be well to refer now to the left end of the housing 180, where it will be seen from Figs. 9, 10 and 11 that in front of the partitions 223, two vertically spaced horizontal chambers 225 and 226 are made by a die withdrawn from the front of the housing to leave a thick horizontally disposed shelf member 227 therebetween. The rear boundary of these chambers and also the rear wall of the shelf 227 are determined by a vertically withdrawn die which leaves the chamber 228 opening upon the front end of the cover plate 184. Upon opposite sides of the shelf 227, namely, above and below it the other cross members 229 are provided, as best seen in Fig. 11, parallel to the shaft and integral with the main housing.

The nose 181, broadly speaking may be said to be severable from the front end of the housing 180 along the plane indicated by the line 230. With the nose removed, the journals for the shaft 220 are provided by a drill and reamer operation which cuts through the support 227 to provide a bore 231 therein, which, after the shaft 220 is inserted, receives the reduced shaft portion 232 of the power take-off head 233 upon which is supported a larger gear 234.

The bore 231 is first drilled with a step feed operation clearing the chamber 228, after which the journals 221 and 222 are drilled in rapid succession. If desired, the journal 231 may be enlarged by reaming or burnishing to a diameter slightly larger than the bores 221 and 222 so that the shaft 220 may be slipped very easily into place.

It will be noted that the shaft 220 is journaled directly in the die cast metal in the preferred embodiment. This arrangement is made possible because the maximum shaft speed at this point in the gear reduction is within the safe speed for shafting journaled in die cast metal. Moreover, the shaft is comparatively short and the area of the bearings comparatively large. In this way by providing a large speed reduction up to the shaft 220, the gear housing has power transmitted to its forward position by means of a construction which is simple to machine and install.

The shaft 220 carries, upon its front end, a beveled gear portion 235 tapering toward the front, and a heavy helical gear 236 upon the rear portion thereof, an Allen screw being indicated at 237 for locking the gear on the shaft.

In mounting the gear 235 in position upon the shaft, the gear 235 is inserted first into chamber 228 in axial alinement with the bore 231, after which the shaft 220 is inserted therethrough and moved rearwardly into the gear 218 over the last portion of its movement, after which the gears 218 and 235 are locked in place. Suitable oil holes 238 are provided to assist in lubricating the shaft 220.

Two other shafts are journaled in the partition 223 and the shelf 227 to comprise a heavy gear reduction train driving the power take-off shaft 233. These shafts are best shown in Fig. 10 wherein an intermediate shaft 241 disposed slightly above and to one side of the shaft 220, (see Fig. 11) is either journaled or press fitted into bores 242 and 243 machined, respectively, in the partition 223 and in an upstanding ear 244 upon the shelf. In event the shaft 241 is press fitted into place, it journals upon its mid portion a reduction gear wheel 245 driven from the teeth 236, upon the gear 235.

The gear 245 carries spur gearing 246 which in turn drives a large gear 247 mounted upon a shaft 248. The shaft 248 extends beyond opposite sides of the shelf 227 and partition 223 and is journaled therein below and to one side of the shaft 241 where it carries, upon its front end, a spur gear 250 engaging the gear 234 upon the power shaft. At the rear end of the shaft, a worm 251 is mounted to drive a worm wheel (see Fig. 14) 252 journaled upon a headed stud 253 threaded into a lug 254 and disposed behind the partition 223.

The gear 234 is press fitted upon the head portion 233 of the power shaft, as already mentioned, and is grooved as at 255 upon the front face thereof to receive a fiber grease seal 256 in a manner mating with a corresponding groove 257 upon the rear face of the removable nose 181 so that grease in the gear chambers will not seep into the power take-off socket. In assemblage the power take-off shaft and gear 234 are the last to be inserted before the nose 181 is inserted in place, after which the nose 181 is secured by recessed bolts 258 threaded into the shelf 227 as at 270, the nose being held in lateral registry by a tongue and groove relation, as indicated at 261 (see Fig. 12). The gearing upon the gear wheel 234 is beveled in a direction to create a slight end thrust forwardly upon the gear wheel 234 in a manner compressing the fiber washer 256.

Returning now to the worm drive 251 on the shaft 248, the worm driven wheel 252 has secured to the bottom thereof a bracket 262 provided with a horizontal portion 263. The horizontal portion has a longitudinal groove 264 therein, the sides of which engage the squared reduced portion 265 of a bolt 266 which in turn extends downwardly therethrough to receive a clamp nut 267 thereon at its lower end. A shoulder 268 upon the clamp nut supports the forward end of an oscillating arm 270 above it upon a reduced journal portion 271. A washer 272 cooperates with the shoulder 268 to hold the ends of the arm 270 in position and the reduced portion 271 is axially wider than the thickness of the arm 270 so that manipulation of the nut 267 at no time interferes with the journaled relationship between the arm and the reduced portion 271. With this construction, the bolt serves as a pivot point for the arm 270 and may be adjusted and secured at any position along the slot 264.

As shown in Fig. 14, the bolt 266 is located at one end of the slot where it is coaxial with the axis of rotation of the wheel 252 that supports the bracket. In this position the gear housing is held stationary during operation.

As shown in Fig. 14 the rear end 273 of the arm 270 is apertured as at 274 to fit over a stud 275 riveted to the collar 148 where the stud 275 extends upwardly through an arcuate slot 276 in the bearing ring 164. This provides a fixed thrust point for the rear end 273 of the arm 270.

Thus, as the nut 267 is adjusted in the slot 264 to a position off-center the wheel 252, the gear housing will be caused to oscillate on the bearing ring 164 with an amplitude that can be set and changed through adjusting the relative position of the stud 275 in relation to the location of the bolt 266 as respects the axis of the shafts 253.

Two embodiments of the stud and arm relationship are shown in the drawings. In Fig. 4 an embodiment is shown where the arm 270 is positioned above the cover cap 184' where it is urged downwardly to fit over the stud 275' by compression spring 277 carried by a cap bolt 278 so that whenever the transmission housing is raised and lowered the arm 270 is engaged and disengaged readily with the stud 275.

In Fig. 14 the arm 270 is shown as located below the cover cap 184. Also, the stud is carried by the arm and drops through the slot 276 into a hole 281 in the collar 260.

In both instances, disengagement between the arm 270 and the collar 160 may also be had while the beaters are in their lowered position so that the beaters may be oscillated in the bowl by hand instead of automatically whenever desired. The means for accomplishing this is a knurled handle 282 upon the side of the transmission housing. The handle operates a shaft 283 which carries a lifter 284 and as shown in Fig. 14 the lifter engages a flange 285 upon the end 273 of the arm 270. In its lowered position the lifter 284 supports the rod whenever the transmission housing is raised, thereby serving as a means for carrying the stud 275 out of the engagement 281 when the transmission is raised. Whenever it becomes desirable to oscillate the beaters manually the knurled handle 282 is rotated a half turn and the lifter 284 acting upon the flange 285 raises the stud 275 out of the hole 281, at which time the flattened lowered face 286 of the lifter engages the lower face of the flange 285, and this engagement is maintained by the flatness until the handle 282 is manually returned to its original position.

In order for the arm 270 to extend below the cover cap 184, in the preferred embodiment of the invention, the cap is die cast with an upwardly flanged opening 287 around the bracket 262. The opening is contoured to permit movement and access to the parts involved in adjusting the oscillation of the gear housing and the flanged portion 288 serves to prevent grease in and around the gear wheels from leaving the compartment.

Thus, the beaters may be oscillated automatically or by hand, back and forth across the center of the bowl as desired and in event the oscillation is made automatically, the extent of the oscillation can be varied for bowls of different sizes, readily and conveniently. The particular adjustment provided moreover can be made while the beaters are running.

Presupposing that the transmission is oscillating, the operator merely loosens the knurled nut 267 and moves the transmission to its center position, after which the nut can be tightened without further ado and the beaters are held to rotate about fixed axes. Then when it becomes desirable to adjust the degree of oscillation of the transmission, the nut is again loosened. As the wheel 252 rotates, the transmission housing can be pressed sidewardly so that there will be a feel of the gradual yield of the bolt 266 in the slot 264. When the desired limit of the yield is reached, the nut is tightened. Thereafter, the oscillation of the beaters will follow from that limit to another corresponding limit upon the opposite side of the center of the bowl, it never being necessary to raise the transmission and look under it to make the oscillation adjustment or vary the degree thereof.

With regard to the rapidity of the oscillation we prefer and have so provided a speed approximating ten oscillations a minute. With this speed and constructions, the beaters are disposed proximate the side of the bowl in one position long enough to move the bowl on the turntable and thereafter the beaters are accelerated past the center of the bowl toward the opposite side for a dwell of sufficient duration to start the bowl rotating in the opposite direction. The timing is such that the bowl will become stationary while the beaters are passing over the center thereof. The beaters thereby never oppose the mix in the bowl but work with it to a better advantage than heretofore accomplished where spindles of conventional constructions have a tendency to centrifugate the liquid outwardly over the sides.

The beaters are driven from the beveled gear 235 by a transmission arrangement readily adaptable to permit structural changes whereby the beaters may be located in a plane transverse to the transmission housing as shown in the preferred embodiment in Fig. 11, and, in the manner whereby the load upon the beveled gear 235 is balanced upon both sides of the journal 221.

More particularly the housing 34 is drilled vertically from the bottom thereof along an axis intersecting the bore of the journal 231. This operation provides a vertical bore 300 in the lower cross member 229, a similar bore 301 in the shelf 227 and a bore 302 in the upper cross member 229.

Two stud shafts 303 and 304 are press fitted into the bores 302 and 300, respectively, from the outside and terminate in the bore 301 with sufficient clearance to permit the shaft 232 of the power gear 234 to rotate in its journal 231 between them. The stud shafts 303 and 304 carry, in the compartments 225 and 226, gears 306 which rotate in opposite directions upon the stud shafts 303 and 304. The two gears 306 are identical, each having a beveled gear portion 307 driven from the beveled gear 235 and are provided with helical gear teeth 308 which drive the shafts supporting the beater elements through gears 310 mounted upon the beater driving shafts.

Referring particularly to Fig. 9, the beater shafts are indicated by the numeral 311 and as shown sectionally in Fig. 11 are provided at the upper end with a slot 313 which receives a latching spring 314 secured in the slot by deforming the body portion of the beater shaft near the lower end of the slot as at 315 to hold the spring in place.

The upper end of the spring is curved outwardly as at 316 to provide a latching portion extending outwardly beyond the contour of the shaft 311 to engage in any one of the four notches 317 provided in the upper end of the beater supporting shaft 318 by cross kerfs cut therein. These structural characteristics are also shown in Figs. 19 and 23.

In Fig. 11 the shaft 318 is shown as constructed when the food mixer is designed to have a fruit juicer driven by power derived from other than one of the beater shafts, whereas, in Fig. 23, a construction is shown whereby the fruit juicer is mounted and driven with respect to one of the beater shafts.

In Fig. 11 the shaft 318' is shorter to receive the shaft 241 over the top thereof for purposes of compact assembly.

The shaft 318, which is the longer of the two shafts, extends up into the compartment 225 where it receives one of the gears 310 which is in mesh with the gear 306 mounted upon the stud shaft 303. The other of the gears 310 is mounted upon the shaft 318' where the shaft passes through the compartment 226. The other of the gears 310 is in mesh with the gear 308 mounted upon the lower stud 304. In both mountings, the hubs 320 of the gear 310 are designed to clear the beveled gearing 307 upon the gears 306. In this manner a very compact assembly is provided for the gear and shaft units involved in the beater drive mechanism.

The shafts 318 and 318' may be located in a plane transverse to the axis of the shaft 220 as shown in Fig. 10, or they may be located in a plane disposed at an angle to the shaft 220 as shown in Fig. 20, it being appreciated that the casting and drilling of the stud and bores for the shafts 318 and 318' may be rotated bodily about the axis of the stud shafts 303 and 304 without disturbing the gear arrangement described. In this way the particular gear arrangement disclosed is readily adaptable to changes in the relative location of the beater elements 36 in the bowl, depending upon whether it is desirable to oscillate the beater elements in the bowl through coinciding arcs or through concentric arcs geometrically spaced from each other so that one beater passes to one side of the center of the bowl while the other beater passes over the center of the bowl as the transmission is oscillated back and forth above the bowl.

In the particular embodiment shown in Figs. 9, 10 and 11, it has already been mentioned that the shafts 318 and 318' lie in a plane transverse to the axis of the shaft 220. In disposing these shafts in this position, bosses 321 are cast in the body portion of the transmission housing upon the lower side thereof and are drilled at 322 to receive bronze bearing sleeves 323 therein which are burnished to size. Openings 230 are internally threaded as at 324 to receive gland nuts 325 which hold the shafts 318 and 318' in position with a grease gland packing 326 disposed between the lower end of the bearings 323 and the top portion of the gland nuts 325.

Before describing the assembly of these parts, reference may be made to Fig. 23 wherein the fruit juicer is driven coaxially from one of the beater shafts. In this instance, both beater shafts 318 and 318' are of the same length, both terminating flush with the bottom wall of the compartment 225. In this embodiment, the upper of the two gears 310 is mounted upon a third shaft 327 as by a rotary lock slip engagement 328 such as a key lock. The lower end of the shaft 327 is hollowed as at 330 to receive and provide head room for the upper end of the beater shaft 311. Radially spaced prongs 331 extend downwardly and are provided thereon to engage in two of the kerf slots 317 in driven relationship therewith. The upper end of the shaft 327 is drilled out as at 32 to receive the lower end of the reamer shaft 333. Axially located slots 334 are provided upon the upper end of the juicer shaft 327 to receive the pressed radial flanges 335 carried by the reamer shaft 333. The slot and flange relationship, just described, provides a drive relationship between the juicer shaft 327 and the reamer shaft 333, and also supports the reamer shaft against pressures borne thereby 170 is preferably formed with an arc of a greater radius than the distance between the lower part thereof and the pintle of the hinge 167. At a predetermined point, a shoulder 372 is provided on the spring 170 to engage with the shoulder 373 upon the base plate to hold (see Fig. 1) the gear housing in raised position with the beaters as shown at 36 when the housing has been pivoted upwardly above the hinge 167. A reverse bend 374 at the upper end of the spring has a downwardly facing shoulder 375 thereon which engages with the shoulder 376 upon the base plate to prevent too wide a pivotal movement of the transmission.

The transmission is shown raised in Fig. 6 where also a means is shown as provided for releasing the latch in those constructions where the shoulder 372 upon the spring 170 is not fashioned to be releasable automatically under a downward pressure upon the transmission. This construction comprises a lever 380 pivoted to the base plate at 381 to press against the front end of the spring 170 when the transmission is in raised position. The top of the lever 380 extends through the top wall of the transmission where it receives a head 382 below the handle at a place where it can be easily moved by hand to release the spring whenever it is desirable to lower the transmission. In this way a very simple construction is provided for quickly raising and lowering the beaters with regard to the bowl.

The location of the head 382 is where it can be reached and pressed by the little finger of a hand taking hold of the handle to move the transmission downwardly. Moreover, the particular construction illustrated is one well adapted for automatic support for the transmission where certain users or types of users may require either hand or automatic to the exclusion of the other.

Referring now to Figs. 18, 19, 20 and 21, an embodiment is shown wherein the transmission may be oscillated relative to the motor housing yet is otherwise rigidly secured relative thereto with regard to raising and lowering the beaters in the bowl. In this embodiment the motor and transmission pivot about a horizontal axis proximate the plane of the base. In this particular embodiment also the power take-off shaft 232' is shown driven by a worm reduction from one of the beater shafts, a construction possible with the transmission shown because of the unique structural characteristic, that the beater shaft can be located in any plane with respect to the axis of the shaft 220''.

In this particular embodiment the rotatable collar 164' is secured by the screws 392 holding the retaining ring 165', the collar 164', the base plate 184' and the housing together as an integral unit. This construction permits the transmission to oscillate relative to the motor and in providing this a worm 383 is mounted upon the shaft 220'' to drive a worm wheel 384 journaled upon a headed bearing lug 385 press fitted into a bore 386. The worm wheel 384 carries a slotted yoke 262' similar to that shown in Fig. 14 and the corresponding parts are here indicated by corresponding numerals.

In this particular instance, however, the thrust arm 270' is located inside the base plate 184', with an opening 387 accommodating the adjusting nut 287' and having upturned edges 388 therein to retain the grease inside the compartment. A slide plate 390 is mounted upon the stud 266 to slide back and forth over the upturned edges 388 so that foreign matter will be kept out of the transmission as well as grease kept in the transmission.

Adjustment for oscillation in this instance is identical as shown in the embodiment illustrated in Fig. 9, and the thrust arm 270' raised and lowered in the manner shown in Fig. 4 by a handle 282' operating a cam that raises and lowers the thrust arm 270' to disengage the stud 275' from the opening 281'. In this instance, however, as already described the opening is upon the thrust arm 270' and the stud is secured from the collar 168', a slot 276' being provided to accommodate relative movement between the supporting collar and the ring during oscillation.

Referring now to the manner in which the embodiment shown in Fig. 18 is raised and lowered with respect to the bowl, an automatically releasible spring 406, somewhat similar to the spring 170, is mounted upon the base 30. In this instance, however, the spring 406 is bent inwardly arcuately with regard to the pivotal axis 408 rather than outwardly so that when excess pressure is brought to bear against the transmission to lower it the spring buckles to tilt the retaining shoulder 372' in a direction releasing the motor casing and permitting the beaters to be lowered into the mix.

In this construction, the bolts 51 are received in the spider and the switch stopping the motor is mounted in a housing 408 upon the base 30 with push rod 409 employed to close the contacts only when the rim 410 of the spider is lowered in place.

Referring to the worm driven power take-off shaft 232', the left hand beater shaft 311', as viewed in Fig. 19, is disposed farther forward than the right hand beater shaft enough for the worm 416 upon the power take-off shaft to clear the beveled gears 307'.

In providing the construction shown, the beater shafts carrying the beaters are the same length and have the gears 310', which drive them, located at the same point upon them except that the gears have their hubs extending in opposite directions, namely, one up and one down. The beveled gear 235' upon the shaft 220' drives two identical gear members 307' rotatably upon a single stationary stud shaft 417. In this instance, however, the identical gear members have the beveled tooth portion 308' inside the gear instead of outside thereof and the beveled portion is of a size small enough to clear the driving gear 234'.

The beater shafts are driven from the two beveled gears 310' and below the gear upon the left beater shaft 311' a worm 418 is secured to the beater shaft in driving engagement with the worm wheel 416 upon the power take-off shaft. Although the power loss is much greater with worm gearing than with spur beveled gearing, this particular construction lends itself to driving light power attachments. In fact, this particular construction is well adapted for use with mixers sold with few if any power attachments to be used therewith. The speed of the shaft 220'' is very low and the gear housing is provided in one single compartment accessible from the front. In assembly, the gear 235' is inserted and locked on the shaft 220'' before the shaft 220'' is slipped into place and the single stud shaft is next inserted with the driven gears located in mesh with the beveled gear 235'. After this the beater shafts are assembled in predetermined relationship to interdigitate the beaters ready to receive the nose of the handle portion. The power take-when citrous fruits are pressed against the reamer 335 mounted upon the upper end of the reamer shaft 333.

Where the juicer shaft 327 extends through the handle portion 335, a boss 336 is provided and has cast therein a cylindrical bore 337 tapered slightly to receive in supporting relationship the lower end of a tubular supporting member 338 upon which the juicer bowl 340 is mounted and held in place as by a clamping nut assembly 341 securing the hub 342 of the bowl 340 against a metal washer member 343 mounted upon the upper portion of the sleeve 338.

The assembly and timing of the transmission is very simply had by first locating the stud shafts 303 and 304 in place with the respective gears 310 thereon. The shaft 220 is inserted next through the journal 231 with the gear 237 slipped in place as the shaft 220 moves through the compartment 228. This locates the beveled gear 235 between the beveled gears 307 and links these gears in fixed relationship so that subsequent installations of the beater shafts may be made with complete assurance of proper interdigitation of the beater elements at all times.

Depending upon a matter of convenience, the beater sleeves 323 may be slipped in place at any time. The shafts 318 and 318' are next installed with the gears 310 located thereon as described. At this time the stepping of the interdigitation is determined before the Allen screws on the gears 310 are tightened. The shafts for the power take-off drive are next installed with the respective gears thereon, and, as the final step of the assemblage of the gears, the power gear and shaft 232 are slipped in place where it is held in assembled relationship by the nose of the handle portion when the bolts 259 are installed.

In the assembly of the construction shown in Fig. 23 the assembly of the parts is the same except the shaft 318' and the shaft 327 in the juicer drive are the last to be inserted. In fact, they are inserted in place after the handle has been secured in place. At the time the mesh of the upper gears 310 is determined, a tool is slipped upwardly from the bottom to hold the gear 319 in place. After the handle is secured in place, the shaft 327 is slipped downwardly until the kerf on the end thereof mates with the keyway 328, it being understood that a hexagonal mating relationship may be provided if desired so long as identifying means are present to locate the lugs 331 in their proper place. The relationship between the gear 310 and shaft 327 is one of a tight fit which can be broken only by a punch inserted where the locating tool was employed.

After the gear 310 is so positioned, the shaft 318' may be inserted in place and the gland nut tightened to hold it in place.

From the description thus far it will be seen that a simple and efficient gearing arrangement is provided which can be easily assembled and dismantled when occasion requires. Moreover, the gearing arrangement is flexible enough to take care of a large number of food mixer contingencies in event it becomes desirable to rearrange the food beaters in different models if the food mixer is going to be used or designed for any special applications.

Referring now to Figs. 2, 15, 16, 17 and 24, a construction is shown wherein the transmission housing may be removed from the motor unit and by the use of a flexible drive 359, the beaters can be used to mix food material at a place removed from the motor. Moreover, the construction shown is one which illustrates an embodiment of the invention which can be used with the other modifications, wherein the transmission is set to work in either one of two fixed positions without oscillation.

For the purpose of permitting the transmission to be removed and operated remotely from the motor, the shaft 220' extends rearwardly a greater distance than the shaft 220. In this embodiment the shaft 220' extends beyond the motor axis where it receives a reduction gear 351 which is in mesh with a spur gear 352 upon a jack shaft 353 that is journaled in a sleeve 354 to carry also a beveled gear 355 meshing with a spur bevel 356 driven directly by the motor shaft. The spur bevel 356 is formed integrally with the female member 143' of the universal coupling. In this particular embodiment, however, the female member 143' rotates upon a headed stud shaft 357, press fitted into a vertical bore 358 and held by a sleeve 360.

The rear end of the shaft 220' is provided with a tongue 361 thereon which extends into a threaded bore 362 adapted to receive the driving end 363 (Fig. 2) of the flexible shaft 359. Driving engagement is established by locating the tongue 361 in a groove mating therewith upon the flexible drive and threading the gland nut 364 to tightened position. This attachment is made when the transmission housing is removed for remote mixing. A gearing arrangement constructed to give the shaft 220' the same driven characteristics are employed to drive the flexible shaft, as shown in Fig. 2, and comprises a large beveled gear 365 in mesh with a pinion bevel gear 366. The bore 267 for the jack shaft 353 is located by a drill guided in relation to the journals of the shaft 220'. After the bore 267 is drilled the sleeve 354 is inserted in place to receive the jack shaft 353 and a suitable shoulder 368 is provided in an enlarged portion of the bore 267 to receive a welch plug 370 that seals the end of the jack shaft.

Referring now to Fig. 24, the supporting collar 148' is an integral construction designed to support the transmission without oscillation at either one of two points. In this construction the supporting collar 147' at the rear thereof is provided with an arcuate groove 371 longer than the lug 144', while at the front, two latch openings 151' are provided to locate the collar relative to the latch 152' at either one of two positions.

In the position shown in Fig. 24, the collar 148' is being supported in a position that locates the beaters at the side of the bowl. In the other position the beaters are located at the center of the bowl, the distance between the latch openings 151 being angularly such that a large bowl of a given size is accommodated.

Whenever it is desirable to attach the transmission to the motor, the shoulder 147' is inserted under the lug 144 and the front end lowered in place to dispose the beaters either in the center or at the side of the bowl. If the latch does not snap home immediately a slight oscillation of the transmission will cause the latch to seek the opening nearest to it, after which the transmission will be held rigidly in that position.

To raise and lower the beaters of this embodiment with respect to the bowl the spring support 170 has already been described as being secured to the collar by eyelet 198. The spring off shaft is journaled in the nose portion of the handle where it is inserted in place and held by the worm wheel 416 press fitted over the end thereof. When the handle is mounted upon the transmission, the worm wheel readily engages with the worm gear, after which the assembly bolts are assembled and tightened.

Referring to Fig. 3, a meat chopper power attachment 421 is shown in place on the nose portion 181 of the handle 182 at the front end of the transmission housing where a male portion 422 of the meat chopper is shown inserted in the socket with a latch 423 securing it in place. This latch comprises a rock arm formed with an obtuse angle and pivoted to the bottom of the nose portion to carry a latch pin 424 loosely mounted at one end to retract from the socket when the arm is pressed upon the other end. In this construction, a very simple means is provided for attaching and detaching food attachments to the front end of the transmission, the latching mechanism being available for manipulation whether the transmission is raised or lowered.

Referring to Fig. 22, the molded drain opening 425 upon the juicer bowl 340 extends outward over the edge of the bowl and a stainless or chromed flexible tube 426 is secured thereto to direct the juice into the bowl 32 or into a container next to the bowl. The character of the tube is such that it will hold any position to which it is deformed under normal usage. In some instances it may be desirable that this tube be removable, in which instance the upper end of the tube is provided with a band clamp 427 releasibly controlled by a lock lever 242.

Referring now to Figs. 24, 25, 26, 27 and 28, an attachment is shown which can be secured to and used with the motor housing when the transmission is removed. This is a food liquifier unit 459 wherein the beater elements are knives 451 rotated at motor speed to reduce any solids to a liquid that are placed in the container. In this particular construction, the container is indicated by the numeral 452 and comprises a substantially tubular member open at both ends, the upper end 453 of which is cylindrical and provided with an outwardly projecting flange 454 adapted to receive a cap 455 thereon in a relation commonly known as a bayonet joint.

The lower portion 456 of the container tapers inwardly upon four sides to an inwardly rounded bottom 457 serving as a liquid foil to carry the contents, without loss of motion, to and from the blades depending upon the set of the blades if the blades are set to propel the liquid contents as well as cut the solids therein. The outer, lower end of the container is threaded, as at 458, in a manner similar to a Mason jar and receives thereon a cap 460, the bottom portion of which is substantially identical in shape with the supporting collar 148' shown in Fig. 15, so that the food container may be located on top of the motor housing and snapped in place against inadvertent removal or dislodgement. The center 461 of the cap portion is apertured to receive a threaded sleeve 462 in which a bearing 463 is supported to journal a shaft 464 that carries the knives 451. The lower end of the shaft 464 has secured thereto a female member 143" mating with the male member 136 upon the upper end of the motor shaft 73, so that relative displacement of the two axes will not cause vibration, but rather the male and female members will work as a universal joint. A lock nut 465 is provided to hold the threaded sleeve in place and two rubber gaskets 466 are provided upon opposite sides of the supporting collar to seal the opening through which the sleeve is assembled.

The upper end of the shaft is threaded, as at 467, to receive the blades 451 thereon which are held locked in place by stainless steel clamp nut 468 hexed as at 470 to receive a wrench.

Whenever it is desirable to clean the knives the container is emptied, inverted and with the purchase afforded by the handle 471 the container is held in one hand and the collar 460 loosened with the other hand to remove it from the mason threads. The collar then is moved to one side and tilted to bring one end of the blades out first, after which the others will follow easily. The washer 472 is removed and every part that touches food can be rinsed and scalded to prevent contamination of liquids with which the device may be used at a future date. The handle 471 prevents slippage generally encountered in handling containers of conventional liquifiers and the bayonet joint is so constructed that one of the lips 454 is located opposite the handle so as to provide a pouring spout or bead when the container is lifted from the motor and the contents are poured into a glass.

In operation, the knives are set preferably to force the liquid outwardly and up the side of the container and, in view of the fact that this develops a swirl centrifugate and the heavy articles therein slide against the side of the container, an improved construction is provided for returning the solid particles centrally to the downward vortex developed by the swirl. This improved means comprises deflectors 473 cast integrally with the cap to catch the high swirling portions of the liquid and direct them inwardly, it being understood that these deflectors and the bayonet joint are so constructed and arranged that the bayonet is tightened under the influence of the swirl in the container.

Although certain preferred embodiments of the invention have been shown and described herein, it will be apparent to those skilled in the art that various uses, modifications and changes may be made therein without departing from the spirit and substance of the invention, the scope of which is commensurate with the appended claims.

What is claimed is:

1. A food mixer comprising a motor, a bowl rotatably mounted at one side of the motor, a beater driven from the motor and disposed in the bowl, and a transmission interconnecting the beater and the motor including a mechanism for rotating the beater on its own axis and for oscillating the transmission means in a horizontal plane and laterally with respect to the axis of bowl rotation to move the beaters back and forth in the bowl.

2. A food mixer comprising a base, a motor transmission casing mounted on the base, a transmission casing mounted on the base, a transmission overhanging the base, an agitator depending from the transmission, means for pivotally supporting the transmission on the motor casing for oscillatory movement in a plane parallel to the base, means for determining the amplitude of the movement during operation of the mixer, and a bowl holding turntable carried by the base for independent movement.

3. A food mixer comprising a motor, a bowl rotatably mounted at one side of the motor, a beater driven by the motor and disposed in the bowl, a transmission means interconnecting the beater and the motor including a mechanism for oscillating the transmission means in a horizontal plane to move the beaters back and forth in the bowl, and means controlling said mechanism to vary said oscillation.

4. A food mixer comprising a motor, a bowl rotatably mounted with respect to the motor, a beater driven by the motor and disposed in the bowl, a transmission means interconnecting the beater and the motor including a mechanism for rotating the beater, means for oscillating the transmission means in a horizontal plane to move the beaters back and forth in the bowl, and means for controlling said mechanism and said oscillating means to vary the rate of oscillation in relation to the speed of the beaters.

5. A food mixer comprising a base, a motor, a casing mounted on the base, a transmission overhanging the base, an agitator depending from the transmission, means for pivotally supporting the transmission on the motor casing for oscillatory movement in a plane parallel to the base, means for determining the amplitude of the oscillatory movement during operation of the mixer, means for varying the rate of oscillatory movement, and a bowl holding turntable carried by the base for independent movement.

6. A food mixer comprising a base, a motor housing mounted on the base, a transmission housing overhanging the base, an agitator depending from the transmission housing, means for pivotally supporting the transmission housing on the motor housing for oscillatory movement in a plane parallel to the base, means for determining the amplitude of the movement during operation of the mixer including a rotor member driven from one of the housings and a link interconnecting the rotor member in cranked relation with the other of said housings, and a bowl holding turntable carried by the base for independent movement.

7. A food mixer comprising a base, a motor housing mounted on the base, a transmission housing overhanging the base, an agitator depending from the transmission housing, means for pivotally supporting the transmission on the motor housing for oscillatory movement in a plane parallel to the base, means for determining the amplitude of the movement during operation of the mixer including a rotor member mounted upon one of the housings including an adjustable crank arm and a link cooperating means interconnecting the crank and the other of said housings, and a bowl holding turntable carried by the base beneath the overhanging transmission housing for independent movement.

8. A food mixer comprising a base, a motor housing mounted on the base, a bowl holding turntable carried by the base adjacent the motor housing, a transmission housing overhanging the turntable, an agitator depending from the transmission housing for positioning in a bowl mounted upon the turntable, means for pivotally supporting the transmission housing on the motor housing for oscillatory movement in a plane parallel to the base to move the agitator back and forth in a bowl mounted on the turntable, a rotor member mounted upon one of the housings and a stationary member upon the other housing, means cooperating with the rotor member and the stationary member for oscillating the transmission housing, and manually controlled means for controlling the last said means to bring it into operation and remove it from operation at will.

9. A food mixer comprising a base, a motor housing mounted on the base, a bowl holding turntable carried by the base adjacent the motor housing, a transmission housing overhanging the turntable, an agitator depending from the transmission housing for disposal in a bowl supported on the turntable, means for pivotally supporting the transmission housing on the motor housing for oscillatory movement in a plane parallel to the base to move the agitator laterally with respect to the bowl, drive means for oscillating the transmission housing with respect to the motor housing including a rotor member mounted on one of the housings, a crank element carried by the rotor member, a stationary member upon the other of the housings, a link interconnecting said members, and manually controlled means for connecting and disconnecting two of said members.

10. A food mixer comprising a base, a motor housing mounted on the base, a bowl supporting turntable carried by the base, a transmission housing pivotally supported upon the motor housing for oscillation in a plane parallel to the base and overhanging the turntable, an agitator carried by the transmission housing and disposed in one of a plurality of bowls capable of being supported by the turntable, means for determining the amplitude of oscillation between the housings including a rotor member having a slot therein mounted upon one of the housings, a crank adjustably mounted with respect to said slot, a member driven by said crank, and means for connecting the crank driven member with respect to the other of said housings in drive relationship.

11. A food mixer comprising a base, a motor housing mounted on the base, a transmission housing overhanging the base, an agitator depending from the transmission housing, means for pivotally supporting the transmission housing on the motor housing for oscillatory movement in a plane parallel to the base, means interconnecting said housings for imparting to the transmission housing said oscillatory movement including a rotor drive member mounted upon one housing, a stationary member mounted upon the other housing and a member interconnecting said rotor member and said stationary member, means for disengaging said interconnecting member and said stationary member, means for guiding one of the last two mentioned members to maintain them in relative position for registry, and a bowl holding turntable carried by the base below the overhang of the transmission housing.

12. A food mixer comprising a base, a motor housing mounted on the base, a transmission housing overhanging the base and having a shaft disposed therein driven from the motor in speed reduced relationship, an agitator depending from the transmission housing, means for pivotally supporting the transmission housing on the motor housing for oscillation in a plane parallel to the base, means for so oscillating the transmission housing with respect to the motor housing including a rotor member carried by said shaft, an adjustable crank upon the rotor member, a stationary member upon the motor housing, a link interconnecting the crank and the stationary member, and a turntable carried by the base for supporting bowls of different sizes.

13. A food mixer comprising a horizontal base, a prime mover having a drive shaft disposed vertically and a housing mounted on the base, a transmission housing pivotally supported on the first housing for oscillatory movement in a horizontal plane, an agitator depending from the transmission housing, means carried by the transmission housing for driving the agitator from said shaft, a second shaft driven from said means, and means for imparting to the transmission housing said oscillatory movement including a rotor member carried by the second shaft, means cooperating with said rotor member for imparting a drive relation between the transmission housing and the first mentioned housing, and a turntable carried by the base for supporting a plurality of bowls of different sizes beneath the overhanging transmission housing.

ALFRED STRAUSS.
ERIC G. FELTMAN.
MELVILLE M. HUNT.
WATSON D. HARBAUGH.